US005723021A

United States Patent [19]
Nguyen

[11] Patent Number: 5,723,021
[45] Date of Patent: *Mar. 3, 1998

[54] METHOD FOR INHIBITING DEPOSITION IN PULP AND PAPERMAKING SYSTEMS USING A COMPOSITION COMPRISING OF POLYVINYL ALCOHOL, GELATIN AND CATIONIC POLYMER

[75] Inventor: Duy T. Nguyen, Jacksonville, Fla.

[73] Assignee: BetzDearborn Inc., Trevose, Pa.

[*] Notice: The term of this patent shall not extend beyond the expiration date of Pat. No. 5,536,363.

[21] Appl. No.: 700,974

[22] Filed: Aug. 21, 1996

Related U.S. Application Data

[63] Continuation-in-part of Ser. No. 651,077, May 22, 1996, which is a continuation-in-part of Ser. No. 421,349, Apr. 12, 1995, Pat. No. 5,536,363.

[51] Int. Cl.⁶ .............................. D21H 17/44; D21C 9/08
[52] U.S. Cl. .................. 162/168.1; 162/174; 162/199; 162/DIG. 4
[58] Field of Search ................ 162/5, 168.1, 174, 162/199, DIG. 4, 173

[56] References Cited

U.S. PATENT DOCUMENTS

| | | | |
|---|---|---|---|
| 3,582,461 | 6/1971 | Lipowski et al. | 162/72 |
| 4,190,491 | 2/1980 | Drennen et al. | 162/76 |
| 4,608,123 | 8/1986 | Leahy | 162/146 |
| 4,744,865 | 5/1988 | Dreisbach et al. | 162/168.1 |
| 4,765,867 | 8/1988 | Dreisbach et al. | 162/72 |
| 4,871,424 | 10/1989 | Dreisbach et al. | 162/168.1 |
| 4,886,575 | 12/1989 | Moreland | 162/5 |
| 4,956,051 | 9/1990 | Moreland | 162/199 |
| 4,995,944 | 2/1991 | Aston et al. | 162/199 |
| 5,074,961 | 12/1991 | Dreisbach et al. | 162/72 |
| 5,223,097 | 6/1993 | Hassler | 162/161 |
| 5,266,166 | 11/1993 | Dreisbach et al. | 162/199 |
| 5,300,194 | 4/1994 | Welkener et al. | 162/199 |
| 5,474,655 | 12/1995 | Schulte et al. | 162/175 |

FOREIGN PATENT DOCUMENTS

| | | |
|---|---|---|
| 1136032 | 11/1982 | Canada. |
| 1150914 | 8/1983 | Canada. |
| 0 280 445A1 | 2/1988 | European Pat. Off.. |

OTHER PUBLICATIONS

Pulp and Paper, James Casey, vol. III, 3d ed., pp. 1587–1588.

Primary Examiner—Donald E. Czaja
Assistant Examiner—Dean T. Nguyen
Attorney, Agent, or Firm—Alexander D. Ricci; Philip H. Von Neida

[57] ABSTRACT

Compositions and methods for inhibiting the deposition of organic contaminants from pulp in pulp and papermaking systems are disclosed. The methods add to the pulp or to the deposition prone surface of the papermaking system a composition comprising a polyvinyl alcohol having 50 to 100% hydrolysis, a high molecular weight gelatin having a molecular weight of about 100,000 or higher, and a cationic polymer.

21 Claims, No Drawings

METHOD FOR INHIBITING DEPOSITION IN PULP AND PAPERMAKING SYSTEMS USING A COMPOSITION COMPRISING OF POLYVINYL ALCOHOL, GELATIN AND CATIONIC POLYMER

This application is a continuation-in-part of application Ser. No. 08/651,077 filed May 22, 1996 which is a continuation-in-part of application Ser. No. 08/421,349 filed Apr. 12, 1995, now U.S. Pat. No. 5,536,363.

FIELD OF THE INVENTION

The present invention relates to compositions and methods for inhibiting the deposition of organic contaminants in pulp and papermaking systems.

BACKGROUND OF THE INVENTION

The deposition of organic contaminants in the pulp and paper industry can cause both quality and efficiency problems in pulp and papermaking systems. Some components occur naturally in wood and are released during various pulping and papermaking processes. The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

Stickies is a term that has been increasingly used to describe deposits that occur in the systems using recycled fiber. These deposits often contain the same materials found in "pitch" deposits in addition to adhesives, hot melts, waxes, and inks. All of the aforementioned materials have many common characteristics including: hydrophobicity, deformability, tackiness, low surface energy, and the potential to cause problems with deposition, quality, and efficiency in the process. Diagram I shows the complex relationship between pitch and stickies discussed here.

| DIAGRAM I | | |
|---|---|---|
| | Pitch | Stickies |
| Natural Resins (fatty and resin acids, fatty esters, insoluble salts, sterols, etc.) | X | X |
| Defoamers (oil, EBS, silicate, silicone oils, ethoxylated compounds, etc.) | X | X |
| Sizing Agents (Rosin size, ASA, AKD, hydrolysis products, insoluble salts etc.) | X | X |
| Coating Binders (PVAC, SBR) | X | X |
| Waxes | | X |
| Inks | | X |
| Hot Melts (EVA, PVAC, etc.) | | X |
| Contact Adhesives (SBR, vinyl acrylates, polysisoprene, etc.) | | X |

The deposition of organic contaminants can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. This deposition can occur not only on metal surfaces in the system, but also on plastic and synthetic surfaces such as machine wires, felts, foils, Uhle boxes and headbox components.

Historically, the subsets of the organic deposit problems, "pitch" and "stickies" have manifested themselves separately, differently and have been treated distinctly and separately. From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickies" have usually been particles of visible or nearly visible size in the stock which originate from the recycled fiber. These deposits tend to accumulate on many of the same surfaces that "pitch" can be found on and causes many of the same difficulties that "pitch" can cause. The most severe "stickies" related deposits however tend to be found on paper machine wires, wet felts, dryer felts and dryer cans.

Methods of preventing the build-up of deposits on the pulp and papermill equipment and surfaces are of great importance to the industry. The paper machines could be shut down for cleaning, but ceasing operation for cleaning is undesirable because of the consequential loss of productivity, poor quality while partially contaminated and "dirt" which occurs when deposits break off and become incorporated in the sheet. Preventing deposition is thus greatly preferred where it can be effectively practiced.

In the past stickies deposits and pitch deposits have typically manifested themselves in different systems. This was true because mills usually used only virgin fiber or only recycled fiber. Often very different treatment chemicals and strategies were used to control these separate problems.

Current trends are for increased mandatory use of recycled fiber in all systems. This is resulting in a co-occurrence of stickies and pitch problems in a given mill. It is desirable to find treatment chemicals and strategies which will be highly effective at eliminating both of these problems without having to feed two or more separate chemicals. The materials of this invention have clearly shown their ability to achieve this goal.

SUMMARY OF THE INVENTION

The present invention provides for compositions and methods for inhibiting the deposition of organic contaminants from pulp in pulp and papermaking systems. The methods comprise adding to the pulp or the surfaces of the papermaking machinery a composition comprising polyvinyl alcohol, a high molecular weight gelatin, and a cationic polymer.

DESCRIPTION OF THE RELATED ART

U.S. Pat. No. 4,871,424 teaches methods for controlling pitch deposition from pulp in papermaking systems utilizing a water-soluble polyvinyl alcohol having 50% to 100% hydrolysis. U.S. Pat. No. 4,886,575 teaches a method for inhibiting the deposition and adherency of hot melt and/or pressure sensitive adhesive materials, "stickies", on the surfaces of repulping equipment using polyvinyl alcohol moieties that also contain some hydrophobic groupings, these PVA moieties having 70 to 99% hydrolysis. "Pulp and Paper", by James Casey, Vol. III, 3rd Ed., pp. 1587–1588, teaches that gelatin has been suggested as a remedy for pitch trouble.

DETAILED DESCRIPTION OF THE INVENTION

The present invention relates to compositions and methods for inhibiting the deposition of organic contaminants from pulp on the surfaces of papermaking machinery in pulp and papermaking system comprising adding to the pulp or to the surfaces of the papermaking machinery an effective deposition inhibiting amount of a composition comprising polyvinyl alcohol, a high molecular weight gelatin, and a cationic polymer.

Organic contaminants include constituents which occur in the pulp (virgin, recycled or combinations thereof) having the potential to deposit and reduce paper machine performance or paper quality. This includes but is not limited to natural resins such as fatty acids, resin acids, their insoluble salts, fatty esters, sterols and other organic constituents such as ethylene bis-stearamide, waxes, sizing agents, adhesives, hot melts, inks, defoamers, and latexes which may deposit in papermaking systems.

The polyvinyl alcohol component of this invention can be derived or synthesized by polymerizing vinyl acetate to form polyvinyl acetate and alcoholysis or hydrolysis of the polyvinyl acetate to form polyvinyl alcohol. The polyvinyl alcohol can have a percent hydrolysis from about 50% to 100% with about 70% to about 100% preferred. The term "percent hydrolysis" is defined as the mole ratio of the hydroxyl groups to the starting acetate groups in the hydrolyzed polyvinyl acetate (polyvinyl alcohol) polymer multiplied by 10. Most preferably, the polyvinyl alcohol has a percent hydrolysis from about 85.5% to about 87%. It is further preferred that the polyvinyl alcohol has a molecular weight from about 15,000 to about 125,000. The polyvinyl alcohols useful in the present invention are readily commercially available. Representative polyvinyl alcohols include Airvol® 205 (MW≈25,000), Airvol® 523 (MW≈78,000) and Airvol® 540 (MW≈125,000), all available under their respective tradenames from Air Products, Inc.

The gelatin that is preferred for use in the synergistic composition has a molecular weight ranging from about 100,000 to about 250,000. Most preferably, the gelatin has a molecular weight of about 130,000. One such gelatin is commercially available from Hormel Foods under the tradename Flavorset GP-4. The term "high molecular weight gelatin" is defined as a gelatin having a molecular weight of about 100,000 or higher.

The cationic polymers useful in the present invention generally are protonated or quaternary ammonium polymers such as the reaction product between an epihalohydrin and one or more amines; polymers derived from ethylenically unsaturated monomers which contain an amine or a quaternary ammonium group; and acrylamide copolymers produced from the reaction of acrylamide and ethylenically unsaturated cationic monomers.

Such cationic polymers can be derived from the reaction of an epihalohydrin, preferably epichlorohydrin, with dimethylamine, ethylene diamine and a polyalkylene polyamine. Preferred polymers include the reaction product of an epihalohydrin with dimethylamine, diethylamine or methylethylamine. More preferred polymers include polyamine and polyethyleneimine (PEI).

Typical cationic monomers useful in preparing the cationic polymers of the present invention can be either amine containing monomers or quaternary ammonium salt containing monomers as represented by the following formulas:

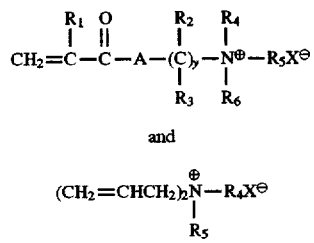

wherein $R_1$ in the above formula represents hydrogen or a lower, $C_1$-$C_3$ alkyl; $R_2$ and $R_3$ independently represent hydrogen or hydroxyl; $R_4$, $R_5$ and $R_6$ independently represent lower, $C_1$-$C_3$ alkyl or benzyl; A represents O or NH; y is 1–5 and X represents chloride or methosulfate.

Typical of the cationic monomers commonly copolymerized with acrylamide are: the aminoalkylacrylate esters and their quaternary ammonium salts (quaternized with such quaternizing agents as methyl chloride, dimethyl sulfate, benzyl chloride and the like); the ammonialkylmethacrylate esters and their corresponding quaternary ammonium salts; the aminoalkylacrylamides and their corresponding quaternary ammonium salts; the aminoalkylmethacrylamides and their corresponding quaternary ammonium salts; the diallyldialkylammonium salt monomers; the vinylbenzyltrialkylammonium salts; and the like.

Non-limiting examples of cationic monomers that can be used in the methods of the present invention include: diallyldiethylammonium chloride; diallyldimethylammonium chloride (DADMAC); acryloyloxyethyltrimethylammonium chloride (AETAC); methacryloyloxyethyltrimethylammonium chloride (METAC); methacrylamidopropyltrimethylammonium chloride (MAPTAC); acrylamidopropyltrimethylammonium chloride (APTAC); acryloyloxyethyltrimethylammonium methosulfate (AETAMS); methacryloyloxyethyltrimethylammonium methosulfate (METAMS); acryloyloxyethyldiethylmethylammonium chloride; methacryloyloxyethyldiethylmethylammonium chloride; methacryloyloxyethyldiethylmethylammonium chloride; and methacryloyloxyethyldiethylmethylammonium chloride. Mixtures of the cationic monomers together with acrylamide to prepare the cationic polymers are also useful in this invention. The instant invention also contemplates homopolymers of the cationic monomers, as well as copolymerization of mixtures of cationic monomers without acrylamide as useful. The above description of cationic polymers should not be construed as limiting the practice of this invention.

Surprisingly, it has been found that when the ingredients are mixed, in certain instances, the resulting mixtures possess a higher degree of inhibiting organic deposition than that of the individual ingredients comprising the mixture. Accordingly, it is possible to produce a highly efficacious inhibitor for use in pulp and papermaking systems. Because of the enhanced activity of the mixture, the total quantity of the deposition inhibitor treatment may be reduced. In addition, the high degree of inhibition which is provided by each of the ingredients may be exploited without use of higher concentrations of each.

The composition of polyvinyl alcohol, high molecular weight gelatin and cationic polymer shows enhanced activity as a deposition inhibitor when the ratio of PVA to gelatin is about 8:1 to about 20:1, e.g., about 9:1 weight/weight percent and the ratio of gelatin to cationic polymer is about 10:1 to about 0.2:1, e.g., about 1:1 weight/weight percent.

The compositions of the present invention are effective at inhibiting the deposition of organic contaminants in papermaking systems. This may include Kraft, acid sulfite, mechanical pulp and recycled fiber systems. For example, deposition in the brown stock washer, screen room and decker system in Kraft papermaking processes can be inhibited. The term "papermaking systems" is meant to include all pulp processes. Generally, it is thought that these compositions can be utilized to inhibit deposition on all surfaces of the papermaking system from the pulp mill to the reel of the paper machine having a pH from about 3 to 11 and under a variety of system conditions. More specifically, the compositions effectively decrease the deposition not only on metal surfaces but also on plastic and synthetic surfaces such as machine wires, felts, foils, Uhle boxes, rolls and headbox components.

The compositions of the present invention may be compatible with other pulp and papermaking additives. These can include starches, titanium dioxide, defoamers, wet strength resins, and sizing aids.

The compositions of the present invention can be added to the papermaking system at any stage. They may be added directly to the pulp furnish or indirectly to the furnish through the headbox. The inventive compositions may also be sprayed onto surfaces that are suffering from deposition, such as the wire, press felts, press rolls and other deposition-prone surfaces.

The compositions of the present invention can be added to the papermaking system neat, as a powder, slurry or in solution; the preferred primary solvent being water but is not limited to such. When added by spraying techniques, the inventive composition is preferably diluted with water to a satisfactory inhibitor concentration. The inventive compositions may be added specifically and only to a furnish identified as contaminated or may be added to blended pulps. The compositions may be added to the stock at any point prior to the manifestation of the deposition problem and at more than one site when more than one deposition site occurs. Combinations of the above additive methods may also be employed by feeding either the polyvinyl alcohol or high molecular weight gelatin or cationic polymer separately, by way of feeding the pulp millstock, feeding to the paper machine furnish, and spraying on the wire and the felt simultaneously.

The effective amount of the composition to be added to the papermaking system depends on a number of variables including the pH of the system, hardness of the water, temperature of the water, additional additives, and the organic contaminant type and content of the pulp. Generally, from 0.5 parts to about 150 parts of the inventive composition per million parts of pulp is added to the papermaking system. Preferably, from about 2 parts to about 100 parts of the inventive composition are added per million parts of pulp in the system.

There are several advantages associated with the present invention as compared to prior processes. These advantages include an ability to function without being greatly affected by hardness of the water in the system; an ability to function while not adversely affecting sizing and fines retention; an ability to function at very low dosages; reduced environmental impact; and improved biodegradability.

Further, these compositions have proven effective against both the pitch and stickies manifestation of organic deposition problems providing for an effective reduction of these problems in paper mills utilizing a variety of virgin and recycled fiber sources.

The data set forth below were developed to demonstrate the unexpected results occasioned by use of the present invention. The following examples are included as being illustrations of the invention and should not be construed as limiting the scope thereof.

EXAMPLES

Standard Tape Detackification Test

In order to establish the efficacy of the inventive composition as deposition control agents on plastic surfaces and specifically for adhesive contaminants of the sort found in recycled pulp, a laboratory test was developed utilizing adhesive-backed tapes as stickle coupons. The stickle coupon can be fabricated from any type of adhesive tape that will not disintegrate when placed in water. For this study, tapes made from a styrenebutadiene rubber and vinylic esters were used. Both of these potential organic contaminants are known to cause stickies problems in secondary fiber utilization. A second coupon was fabricated from polyester film such as MYLAR®, a product marketed by the DuPont Chemical Company. This material was chosen because paper machine forming fabrics are frequently made of polyester which is susceptible to considerable deposition problems caused by stickies and/or pitch.

This test involved immersing a 2"×4" adhesive tape and a 2"×4" polyester Mylar coupon into a 600 gram solution being tested. The solution contained in a 600 mL beaker is placed in a water bath with agitation and heated to the desired temperature. After 30 minutes of immersion, the tape and coupon are removed from the solution and pressed to 10,000 lb force for one minute. A tensile test instrument (Instron) is then used to measure the force required to pull the two apart. A reduction in the force required indicates that the "stickle" has been detackified. The % control or detackification is calculated by the following equation:

$$\% \text{ detackification} = \frac{(\text{untreated force} - \text{treated force})}{\text{untreated force}} \times 100$$

Contact angle measurements were also performed utilizing the inventive composition. The MYLAR or tape adhesive surface is clamped on a film stage and placed inside the glass test cell. The test solution is added to the cell by carefully pouring 15 mL of the solution into the cell. The whole test cell was then placed inside the chamber of a goniometer (Kruss G1 ). The MYLAR or tape adhesive surface was immersed in the solution for 30 minutes to simulate the contact time as in the standard tape detackification test. Contact angle provides information about the hydrophobicity of a simulated stickies surface and the change in the hydrophobicity as surface-active materials are adsorbed and/or desorbed at the surface. If the contact angle of the treated solution is lower than that of the untreated, this indicates that the surface becomes more hydrophilic or less stickle.

For the purposes of the following examples, the following designations are used for the treatments:

Example No. 1 is 9:1:1, by weight, of Airvol® 540:high molecular weight (HMW) gelatin:polyamine.

Example No. 2 is 8:1, by weight, of Airvol® 540:HMW gelatin.

Example No. 3 is 15:1, by weight, of Airvol® 540:HMW gelatin.

Example No. 4 is Airvol® 540.

Airvol® 540 is polyvinyl alcohol (PVA, MW≅125,000) available from Air Products, Inc. (85.5–87% hydrolyzed).

TABLE I

| Contact angle measurements at 25° C. - MYLAR surface | | |
|---|---|---|
| Example No | Dosage (ppm) | Contact Angle |
| 1 | 2 | 19 |
| 1 | 2.5 | 18 |
| 2 | 2.5 | 32 |
| 3 | 2.5 | 24 |

As demonstrated in Table I, the inventive composition of PVA, HMW gelatin and cationic was more effective than PVA, a known inhibitor. Further studies were performed to determine the peel force of various treatments. These results are reported in Table II.

TABLE II

Southern Tissue Mill White Water 78° F.

| | Peel Force (lb - f) | |
|---|---|---|
| Treatment (ppm) | 5 min. | 15 min. |
| Control | 2.291 | 1.257 |
| 4 (1 ppm) | 1.328 | 0.898 |
| 1 (1 ppm) | 0.816 | 0.246 |

Further contact angle measurements were performed on a different water. These results are presented in Table III.

TABLE III

Contact angle of MYLAR or wax
Midwestern Liner Board
Wilhelmy Plate, 2 second contact time

| | Contact Angle | |
|---|---|---|
| Treatment No. (ppm) | MYLAR (T = 78° F.) | Wax (T = 115° F.) |
| Control | 30.1 | 17.7 |
| 4 (10) | 14.4 | 13 |
| 1 (10) | 7.2 | 0.5 |
| 4 (20) | | 15 |
| 1 (20) | | 0.5 |

TABLE IV

Effect of dilution on contact angle
Midwestern Liner Board

| Treatment | Contact Angle | | | |
|---|---|---|---|---|
| No. (ppm) | 1st dilution | 2nd dilution | 3rd dilution | 4th dilution |
| Control | 73 | 74 | 74 | 75 |
| 4 (2.5) | 52 | 52 | 54 | 55 |
| 1 (2.5) | 21 | 19 | 18 | 19 |

Tables III and IV demonstrate that the inventive three component treatment is more effective at reducing tackiness than the PVA.

TABLE V

Interfacial Viscosity
Midwestern Tissue Mill White Water/Oil
Interface at 125° F.

| Treatment No. (ppm) | Interfacial Viscosity (S.C.P.) |
|---|---|
| Control | 0.17 |
| 4 (5) | 0.19 |
| 1 (5) | 0.47 |
| 4 (10) | 0.46 |

The interfacial viscosity (S.C.P.=surface centipoise) is calculated from the dynamic interfacial tension measurements. Interfacial viscosity provides information about the stability of stickies or pitch in solution. If the interfacial viscosity of the treated solution is higher than that of the untreated, this indicates that pitch or stickies particles are more stable in the treated solution. This indicates less deposition of pitch or stickies particles. As demonstrated in Table V, the inventive composition gave better results than the PVA.

TABLE VI

Interfacial Viscosity of
Treated Midwestern Tissue Mill
White Water/Oil Interface at 80° F.

| Treatment No. (ppm) | Interfacial Viscosity (S.C.P.) |
|---|---|
| Control | 0.13 |
| 4 (5) | 0.23 |
| 1 (5) | 0.39 |
| 4 (10) | 0.34 |
| 1 (10) | 0.45 |

As demonstrated in Table VI, the inventive composition produced a more stable and less likely to deposit solution than PVA by itself. Similar results at a higher temperature are demonstrated in Table VII.

TABLE VII

Interfacial Viscosity of
Treated Midwestern Tissue Mill
White Water/Oil Interface at 100° F.

| Treatment No. (ppm) | Interfacial Viscosity (S.C.P.) |
|---|---|
| Control | 0.23 |
| 4 (5) | 0.34 |
| 1 (5) | 0.47 |
| 4 (10) | 0.36 |
| 1 (10) | 0.49 |

The peel force of this white water was also tested and these results are shown in Table VIII.

TABLE VIII

Peel Force
Midwestern Tissue Mill White Water
80° F.

| Treatment | Peel Force (lb - F) | | |
|---|---|---|---|
| No. (ppm) | Tape (10 min) | MYLAR (5 min) | MYLAR/tape (5 min) |
| Control | 4.67 | 2.51 | 2.5 |
| 1 (1) | 1.63 | 1.75 | 0.626 |
| 4 (1) | 2.70 | 2.25 | 0.963 |

TABLE IX

Peel Force
Midwestern Tissue Mill White Water
100° F.

| | Peel Force (lb - F) | |
|---|---|---|
| Treatment No. (ppm) | Treated MYLAR (5 min) | Treated tape (5 min) |
| Control | 1.674 | 1.442 |
| 4 (1) | 1.43 | 1.152 |
| 1 (1) | 1.077 | 0.567 |
| 4 (2) | 1.117 | |
| 1 (2) | 0.89 | |
| 4 (3) | 0.987 | |
| 1 (3) | 0.87 | |

TABLE X

Peel Force
Midwestern Tissue Mill White Water
109° F.
Treated Tape for 5 min.

| Treatment No. (ppm) | Peel Force (lb - F) |
|---|---|
| Control | 2.331 |
| 4 (1) | 1.09 |
| 1 (1) | 0.697 |

TABLE XI

Peel Force
Midwestern Tissue Mill White Water
120° F.
Treated Tape for 5 min.

| Treatment No. (ppm) | Peel Force (lb-F) |
|---|---|
| Control | 2.331 |
| 4 (2) | 1.115 |
| 1 (2) | 0.694 |

Tables VIII–XI demonstrate that the inventive combination of PVA/HMW gelatin/cationic polymer is more effective at detackifying a liner board solution than just PVA alone.

TABLE XII

Interfacial Viscosity
Midwestern Tissue Mill White Water/Oil Interface
at 120° F.

| Treatment No. (ppm) | Interfacial Viscosity (S.C.P.) |
|---|---|
| Control | 0.23 |
| 4 (5) | 0.39 |
| 1 (5) | 0.49 |

TABLE XIII

Effect of Temperature on Interfacial Viscosity
Midwestern Tissue Mill White Water/Oil Interface

| | Interfacial Viscosity (S.C.P.) | | |
|---|---|---|---|
| Treatment No. (ppm) | 120° F. | 80° F. | 100° F. |
| Control | 0.23 | 0.13 | 0.23 |
| 4 (5) | 0.39 | 0.23 | 0.34 |
| 1 (5) | 0.49 | 0.39 | 0.47 |
| 4 (10) | — | 0.36 | 0.36 |
| 1 (10) | — | 0.45 | 0.49 |

Tables XII and XIII demonstrate that the inventive composition provides better inhibition of deposition to a white water solution as shown by the higher interfacial viscosity than the PVA by itself.

TABLE XIV

Contact Angle
Midwestern Tissue Mill White Water
MYLAR/Contact Time = 10 minutes

| | Contact Angle | | |
|---|---|---|---|
| Treatment No. (ppm) | 100° F. | 120° F. | 86° F. |
| Control | 45 | 39 | 50 |
| 4 (1) | 20 | 11 | — |
| 1 (1) | 8 | 8 | — |
| 4 (2) | 22 | — | 41 |
| 1 (2) | 8 | — | 13 |

TABLE XV

Interfacial Viscosity
Southern Liner Board Filtrate/min. Oil
at 124° F.

| Treatment No. (ppm) | Interfacial Viscosity (S.C.P.) |
|---|---|
| Control | 0.19 |
| 1 (2) | 0.3 |
| 1 (4) | 0.46 |
| 4 (4) | 0.29 |
| 4 (8) | 0.36 |

TABLE XVI

Interfacial Viscosity
Southern Liner Board Filtrate/min. Oil
at 131° F.

| Treatment No. (ppm) | Interfacial Viscosity (S.C.P.) |
|---|---|
| Control | 0.12 |
| 1 (4) | 0.35 |
| 1 (8) | 0.38 |
| 4 (4) | 0.22 |
| 4 (8) | 0.32 |

Tables XV and XVI demonstrate that the inventive composition provides better inhibition of deposition to a white water solution as shown by the higher interfacial viscosity than the PVA by itself.

TABLE XVII

Peel Force
Southern Liner Board Solution

| Treatment No. (ppm) | Peel Force (lb-F) | |
|---|---|---|
| | 123° F. | 131° F. |
| Control | 0.693 | 0.652 |
| 4 (0.5) | 0.681 | 0.461 |
| 1 (0.5) | 0.317 | 0.331 |

TABLE XVIII

Effect of Dilution on Contact Angle
Southern Liner Board Solution

| Treatment No. (ppm) | Contact Angle | | |
|---|---|---|---|
| | 1st dilution | 2nd dilution | 3rd dilution |
| Control | 84 | — | — |
| 4 (4) | 21 | 59 | 59 |
| 1 (4) | 7 | 9 | 10 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for inhibiting the deposition of organic contaminants from pulp in pulp and papermaking systems comprising adding to said pulp from 0.5 parts to about 150 parts per million parts pulp of a composition comprising a polyvinyl alcohol having 50 to 100% hydrolysis and a molecular weight from about 15,000 to about 125,000, a high molecular weight gelatin having a molecular weight of about 100,000 to about 250,000, and a cationic polymer wherein the ratio of polyvinyl alcohol to gelatin is about 9:1 weight/weight percent and the ratio of high molecular weight gelatin to cationic polymer is about 1:1 weight/weight percent.

2. The method as claimed in claim 1 wherein said polyvinyl alcohol has 85.5 to 87% hydrolysis.

3. The method as claimed in claim 1 wherein said cationic polymer is the reaction product between an epihalohydrin and an amine.

4. The method as claimed in claim 3 wherein said epihalohydrin is epichlorohydrin and said amine is selected from the group consisting of dimethylamine, ethylenediamine and a polyalkylene polyamine.

5. The method as claimed in claim 1 wherein said cationic polymer is the reaction product between acrylamide and an ethylenically unsaturated cationic monomer.

6. The method as claimed in claim 5 wherein said ethylenically unsaturated cationic monomer has the formula:

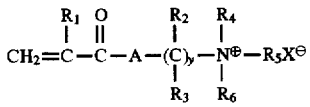

and

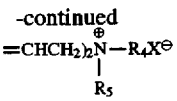

wherein $R_1$ in the above formula represents hydrogen or a lower, $C_1$-$C_3$ alkyl; $R_2$ and $R_3$ independently represent hydrogen or hydroxyl; $R_4$, $R_5$ and $R_6$ independently represent lower, $C_1$-$C_3$ alkyl or benzyl; A represents O or NH; y is 1–5 and X represents chloride or methosulfate.

7. The method as claimed in claim 6 wherein said cationic monomer is selected from the group consisting of diallyldiethylammonium chloride; diallyldimethylammonium chloride; acryloyloxyethyltrimethylammonium chloride; methacryloyloxyethyltrimethylammonium chloride; methacrylamidopropyltrimethylammonium chloride; acrylamidopropyltrimethylammonium chloride; acryloyloxyethyltrimethylammonium methosulfate; methacryloyloxyethyltrimethylammonium methosulfate; acryloyloxyethyldiethylmethylammonium chloride; methacryloyloxyethyldiethylmethylammonium chloride; methacryloyloxyethyldiethylmethylammonium chloride; and methacryloyloxyethyldiethylmethylammonium chloride.

8. The method as claimed in claim 1 wherein said cationic polymer is selected from the group consisting of polyamine and polyethyleneimine.

9. The method as claimed in claim 1 wherein said organic contaminants are stickies deposits.

10. The methods as claimed in claim 1 wherein said organic contaminants are pitch deposits.

11. A method for inhibiting the deposition of organic contaminants from pulp on the surfaces of papermaking machinery and equipment in pulp and papermaking systems comprising spraying onto said surfaces from 0.5 parts to about 150 parts per million parts pulp of a composition comprising a polyvinyl alcohol having 50 to 100% hydrolysis and a molecular weight from about 15,000 to about 125,000, a high molecular weight gelatin having a molecular weight of about 100,000 to about 250,000, and a cationic polymer wherein the ratio of polyvinyl alcohol to gelatin is about 9:1 weight/weight percent and the ratio of high molecular weight gelatin to cationic polymer is about 1:1 weight/weight percent.

12. The method as claimed in claim 11 wherein said polyvinyl alcohol has 85.5 to 87% hydrolysis.

13. The method as claimed in claim 11 wherein said cationic polymer is the reaction product between an epihalohydrin and an amine.

14. The method as claimed in claim 13 wherein said epihalohydrin is epichlorohydrin and said amine is selected from the group consisting of dimethylamine, ethylenediamine and a polyalkylene polyamine.

15. The method as claimed in claim 11 wherein said cationic polymer is the reaction product between acrylamide and an ethylenically unsaturated cationic monomer.

16. The method as claimed in claim 15 wherein said ethylenically unsaturated cationic monomer has the formula:

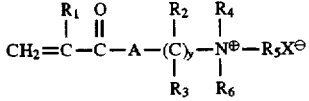

and

-continued

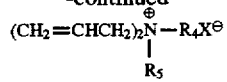

wherein $R_1$ in the above formula represents hydrogen or a lower, $C_1$-$C_3$ alkyl; $R_2$ and $R_3$ independently represent hydrogen or hydroxyl; $R_4$, $R_5$ and $R_6$ independently represent lower, $C_1$-$C_3$ alkyl or benzyl; A represents O or NH; y is 1–5 and X represents chloride or methosulfate.

17. The method as claimed in claim 16 wherein said cationic monomer is selected from the group consisting of diallyldiethylammonium chloride; diallyldimethylammonium chloride; acryloyloxyethyltrimethylammonium chloride; methacryloyloxyethyltrimethylammonium chloride; methacrylamidopropyltrimethylammonium chloride; acrylamidopropyltrimethylammonium chloride; acryloyloxyethyltrimethylammonium methosulfate; methacryloyloxyethyltrimethylammonium methosulfate; acryloyloxyethyldiethylmethylammonium chloride; methacryloyloxyethyldiethylmethylammonium chloride; methacryloyloxyethyldiethylmethylammonium chloride; and methacryloyloxyethyldiethylmethylammonium chloride.

18. The method as claimed in claim 11 wherein said cationic polymer is selected from the group consisting of polyamine and polyethyleneimine.

19. The method as claimed in claim 11 wherein said organic contaminants are stickies deposits.

20. The method as claimed in claim 11 wherein said organic contaminants are pitch deposits.

21. The method as claimed in claim 11 wherein said surfaces are selected from the group consisting of the wire, press felts, and press rolls.

* * * * *